US007955429B2

(12) United States Patent
Pozarnsky

(10) Patent No.: US 7,955,429 B2
(45) Date of Patent: Jun. 7, 2011

(54) ENHANCING THE PROPERTIES OF WAXES BY USE OF TRANS-4-TERTBUTYL-1-PHENYL CYCLOHEXANOL

(75) Inventor: Gary A. Pozarnsky, Roseville, MN (US)

(73) Assignee: Applied Colloids, Inc., Roseville, MN (US)

( * ) Notice: Subject to any disclaimer, the term of this patent is extended or adjusted under 35 U.S.C. 154(b) by 604 days.

(21) Appl. No.: 12/032,171

(22) Filed: Feb. 15, 2008

(65) Prior Publication Data
US 2009/0209776 A1 Aug. 20, 2009

(51) Int. Cl.
C08L 91/06 (2006.01)
C08L 91/08 (2006.01)
C10L 5/00 (2006.01)
C10L 10/00 (2006.01)
C11C 5/00 (2006.01)

(52) U.S. Cl. ........... 106/270; 106/271; 106/272; 44/275
(58) Field of Classification Search .................. 106/270, 106/271, 272; 44/275
See application file for complete search history.

(56) References Cited

OTHER PUBLICATIONS

"Candle Waxes and Additives" http://www.reedwax.com/candle.pdf, downloaded Sep. 4, 2010.*
Marsi et al, "Preparation of cis and trans-4-tert-butyl-1-phenylphosphorine and a study of reaction stereochemistry of its derivatives", J.Org.Chem., vol. 42, No. 8, (1977), pp. 1306-1311.*

* cited by examiner

Primary Examiner — David M Brunsman
(74) Attorney, Agent, or Firm — Henry E. Naylor

(57) ABSTRACT

The use of an effective amount of trans-4-tertbutyl-1-phenyl-cyclohexanol in waxes to increase the melting point, softening temperature, as well of other properties.

15 Claims, 2 Drawing Sheets

ENHANCING THE PROPERTIES OF WAXES BY USE OF TRANS-4-TERTBUTYL-1-PHENYL CYCLOHEXANOL

FIELD OF THE INVENTION

This invention relates to the use of an effective amount of trans-4-tertbutyl-1-phenylcyclohexanol in waxes to increase the melting point, softening temperature, as well of other properties.

BACKGROUND OF THE INVENTION

Both natural and synthetic waxes are well known and have myriad uses in a wide range of industries. For example, wax is used in plastic bonded and melt castable explosives to reduce sensitivity of the energetic material. Other major uses of waxes are its use in: thermal adhesives, cosmetics, paper and textile coatings, heat transfer and heat storage materials, as well as in the tire and rubber industries. While there are many different waxes used today, there is need to increase the melting point of some wax materials to a temperature range of about 90° to about 100° C. Most waxes have melting points in the range of about 50° C. to about 70° C., which makes them unsuitable for uses such as for binders and hot melt adhesives. While there are higher temperature waxes, they typically have melting points in the range of about 120° C. and higher. Uses for such higher temperature waxes are limited because they typically have one or more undesirable properties.

Much work has been done over the years to develop new waxes having unique properties for their intended use. While there are a variety of waxes commercially available, there is still a need in the art for waxes having improved properties in a given temperature range, particularly in the temperature range of about 80° C. to about 100° C.

SUMMARY OF THE INVENTION

In accordance with the present invention there is provided a process for enhancing the melting point properties of a wax or wax blend, which method comprising:

melting said wax or wax blends to form a melt;

adding an effective amount of trans-4-tertbutyl-1-phenyl-cyclohexanol to said melt thereby forming a mixture;

agitating said mixture for an effective amount of time so that substantially all of said trans-4-tertbutyl-1-phenylcyclohexanol dissolves in said melt, thereby resulting in a modified melt;

cooling said modified melt to transform it into a solid state having a higher melting temperature than the starting wax or wax blend.

In a preferred embodiment, the effective amount of trans-4-tertbutyl-1-phenylcyclohexanol is from about 1 wt. % to about 12 wt. %, based on the total weight of the modified melt.

In a preferred embodiment, the wax selected from animal waxes, bacterial or microbial waxes, vegetable waxes, mineral waxes, petroleum waxes, synthetic waxes, and blends thereof.

DETAILED DESCRIPTION OF THE INVENTION

Figure 1:
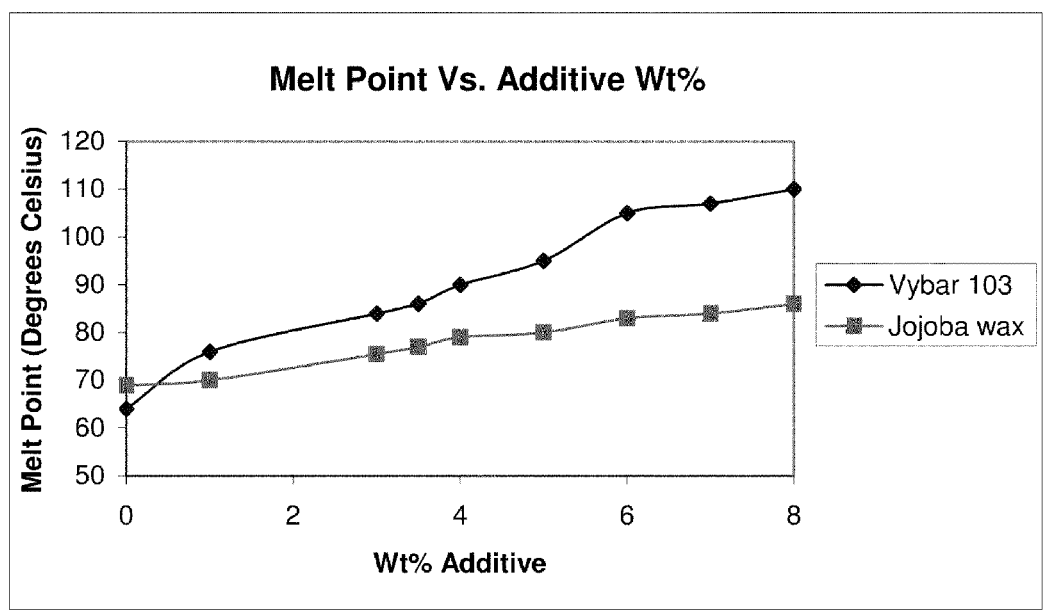
FIG. 1 shows plots of melt point versus wt. % of trans-4-tertbutyl-1-phenylcyclohexanol for the representative of waxes Vybar 103 and jojoba wax.

There is a need in the wax art to increase the melting point of various wax materials to a temperature within the range of about 80° C. to about 100° C. Although higher temperature waxes exist, they typically have melting points in the range of about 120° C. and above. Most waxes have melting points in the range of about 50° C. to about 70° C. Waxes used in applications, such as: for binders in cosmetics, in heat transfer/insulation and for hot melt adhesives would greatly benefit with the ability to withstand heat at temperatures greater than about 70° C.

It is believed by the inventor hereof that the modifying agent trans-4-tertbutyl-1-phenylcyclohexanol, when added to a melt of wax or wax blend forms precipitated nanoparticles of trans-4-tertbutyl-1-phenylcyclohexanol that improve the properties of the host wax material. For example, the addition of an effective amount of trans-4-tertbutyl-1-phenylcyclohexanol increases the melting point, the softening temperature, as well as improving one or more other properties, such as thermal conductivity, permeability, and hardness. Trans-4-tertbutyl-1-phenylcyclohexanol can be represented by the formula:

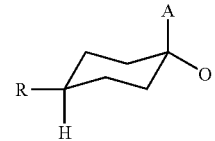

R = tert-butyl

The present invention has the advantage of being an in-situ process wherein a colloidal network of composite nanoparticles is formed in the wax or wax blend matrix being modified. Conventional methods typically use a preformed modifying agent which is then dispersed in the material to be modified. Another conventional method involves the dispersion of preformed nanoparticles such as carbon black, silica or clay platelets within the molten matrix. These conventional dispersion methods lead to undesirable compatibility and agglomeration/dispersion problems in the matrix. The method of the present invention results in the precipitation of trans-4-tertbutyl-1-phenylcyclohexanol within the molten matrix of the wax thereby forming an organic colloidal nanocomposite network which improves the properties of the wax matrix. The present method of improving the properties of lower temperature waxes is superior to such conventional methods as mixing higher temperature melting waxes into a lower temperature wax formulation. This often leads to phase separation and miscibility problems. Practice of the present method does not lead to phase separation or miscibility problems of the components of the blend.

The present invention can be practiced on any type of wax, including both natural and synthetic waxes. Non-limiting examples of natural waxes include: a) animal-based waxes such as beeswax, Chinese wax produced from scale insects, shellac wax, spermaceti wax which a product of the sperm whale, and lanolin which is obtained from sheep; b) vegetable waxes such as bayberry wax, candelilla wax, carnauba wax, esparto wax, jojoba wax, ouricury wax, palm wax, rice wax, and soy wax; c) mineral waxes such as ceresin waxes, montan wax, oxocerite, and peat wax; and d) petroleum waxes such as paraffin waxes, slack wax, scale wax, and microcrystalline wax. Non-limiting examples of synthetic waxes that are suitable for use herein include polyethylene waxes, Fischer-Tropsch waxes, substituted amide waxes, polymerized alpha-olefin waxes, and chemically modified waxes such as those that are esterified, oxidized or saponified. More preferred waxes include jojoba wax, synthetic mineral waxes, microcrystalline waxes and polymerized alpha-olefin waxes.

The present invention is generally practiced by dissolving an effective amount of trans-4-tertbutyl-1-phenylcyclohexanol in a melt of the wax material to be modified. The term "effective amount" as used herein means at least that amount of trans-4-tertbutyl-1-phenylcyclohexanol that will have an appreciable effect on the melt point of the material to be treated. That is, that minimum amount that will increase the melt point by at least about 1° C., preferably by at least about 5° C. and more preferably by at least about 10° C. This effective amount will typically be from about 2 to about 12 wt. %, based on the total weight of material to be treated plus trans-4-tertbutyl-1-phenylcyclohexanol and also on the temperature-dependent solubility of the trans-4-tertbutyl-1-phenylcyclohexanol in the molten waxes. The trans-4-tertbutyl-1-phenylcyclohexanol will dissolve, then precipitate in the cooling melt to form composite nanoparticles that will enhance the melt and solid properties of the material being treated.

The invention will be better understood with reference to the following examples that are presented for illustrative purposes only and are not to be taken as limiting the invention in any way.

EXAMPLES

The addition of trans-4-tertbutyl-1-phenylcyclohexanol will also reduce the brittleness and hardness of the material, preferably waxes or wax blends, that are treated. For example, the hardness of polyalphaolefin and jojoba waxes is decreased by about 50% when at least about 1 wt. % or more of trans-4-tertbutyl-1-phenylcyclohexanol is incorporated in the respective melts. Further, the addition of the trans-4-tertbutyl-1-phenylcyclohexanol to waxes that previously had possessed a high volumetric expansion on melting, such as paraffin, also reduced the amount of volumetric expansion during the melt transition. Addition of the trans-4-tertbutyl-phenylcyclohexanol can also increase their thermal conductivity. For example, for jojoba wax, the thermal conductivity was increased by 40% when 7 wt. % of trans-4-tertbutyl-1-phenylcyclohexanol was used as compared to the original material that contained no trans-4-tertbutyl-phenylcyclohexanol.

The properties imparted to waxes by the practice of the present invention also pertains to the fluorinated family of the trans-4-tertbutyl-1-phenylcyclohexanol, which have similar properties. The addition of the trans-4-tertbutyl-1-phenylcyclohexanol also affects the chemical properties of the waxes. This is shown by the iodine number of jojoba and polyalphaolefin waxes in Table 1 below. This effect also holds for mixtures of various waxes and also the addition of polymers and oils to either a single enhanced wax or a blend of waxes enhanced by the practice of this invention.

Example 1

Synthetic Wax (Polyalphaolefin Wax) and Melt Point

The addition of trans-4-tertbutyl-1-phenylcyclohexanol was done after melting the polyalphaolefin (PAO) wax, Vybar 103, and mixing in the desired amounts (Table 1) and concentrations of the trans-4-tertbutyl-1-phenylcyclohexanol until it was dissolved under agitation. This can be done at concentrations up to the solubility limit of the trans-4-tertbutyl-1-phenylcyclohexanol in the molten wax. The molten wax mixtures were cooled to solid form. The melting points of the waxes were then tested by ASTM D217 and by the use of a PTC Instruments Melt Point Model 333. The relationship of the melt point to the concentration of the trans-4-tertbutyl-1-phenylcyclohexanol is shown in FIG. 1 hereof. The same general relationship between concentration and melt point is also realized for other synthetic waxes of different molecular weights and compositions.

Example 2

Natural Wax (Jojoba Wax) and Melt Point

The addition of trans-4-tertbutyl-1-phenylcyclohexanol was done after melting the jojoba wax and mixing in the desired amounts (Table 2) and concentrations of the trans-4-tertbutyl-1-phenylcyclohexanol until it was dissolved under agitation. The molten wax mixtures were cooled to solid form. The melting points of the wax composite nanoparticles were then tested by ASTM D217 and by the use of a PTC Instruments Melt Point Model 333. The relationship of the melt point to the concentration of the trans-4-tertbutyl-1-phenylcyclohexanol is shown in FIG. 1 hereof. The same general relationship between concentration and melt point is also realized for other natural waxes of different molecular weights and compositions.

Example 3

Mixture of Waxes

Figure 2:
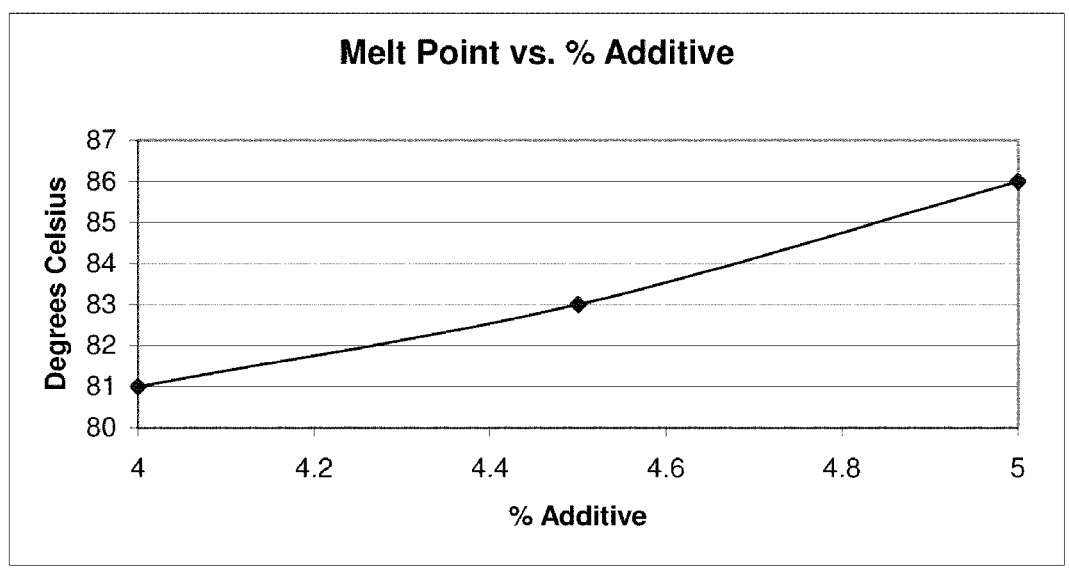
FIG. 2 shows plots melt point versus wt. % of trans-4-tertbutyl-1-phenylcyclohexanol for a 1/1 blend by weight of jojoba wax and a polyalphaolefin wax.

The addition of trans-4-tertbutyl-1-phenylcyclohexanol to mixtures of the waxes also has an effect on the melting point of the mixture. This is shown in FIG. 2 hereof for a 1/1 mixture of waxes. The overall effect on melting point is a combination effect that is dependent on the properties of the waxes in the mixtures.

Example 4

Effect on Iodine Number

The addition of the trans-4-tertbutyl-1-phenylcyclohexanol also has an effect on the iodine number of the waxes as it increases it. This is shown in Tables 1 and 2 separately for the jojoba and Vybar waxes. This effect also holds for the wax mixtures.

Example 5

Effect on Other Properties

The addition of the trans-4-tertbutyl-1-phenylcyclohexanol also has other effects on the physical and chemical properties of the waxes. Addition of 1 wt % and greater decreases the initial hardness of the waxes by 50% which remains constant above this concentration. Addition of 7 wt % trans-4-tertbutyl-1-phenylcyclohexanol to jojoba wax increases its thermal conductivity by 40%. The addition of the trans-4-tertbutyl-1-phenylcyclohexanol to molten waxes and their mixtures also increased the viscosity of the molten materials. This is shown in Table 3 hereof.

TABLE 1

Iodine Values for Vybar Wax and Additive

|  | 0 wt % | 3 wt % | 3.5 wt % | 4 wt % |
|---|---|---|---|---|
| Vybar | 8.3 | 10.18 | 11.17 | 11.6 |

TABLE 2

Iodine Values for Jojoba Wax and Additive

|  | 0 wt % | 6 wt % | 7 wt % | 8 wt % |
|---|---|---|---|---|
| Iodine # | 0.1 | 3.15 | 4.00 | 4.15 |

TABLE 3

Viscosity of Molten Waxes and Wax Mixtures

| Wax Material | Viscosity (cp) |
|---|---|
| Vybar Wax (0 wt % additive) | 371 |
| Vybar Wax (3.5 wt % additive) | 488 |
| Jojoba Wax (0 wt % additive) | 107 |
| Jojoba Wax (7 wt % additive) | 137 |
| Vybar/Jojoba wax (1/1, 5 wt % additive) | 205 |
| Vybar/Jojoba wax (1/1, 4 wt % additive) | 185 |

What is claimed is:

1. A process for enhancing the melting point properties of a wax or wax blend, which method comprising:
   melting said wax or wax blend to form a melt;
   adding an effective amount of trans-4-tertbutyl-1-phenylcyclohexanol to said melt thereby forming a mixture;
   agitating said mixture for an effective amount of time so that substantially all of said trans-4-tertbutyl-1-phenylcyclohexanol dissolves in said melt, thereby resulting in a modified melt;
   cooling said modified melt to transform it into a solid state having a higher melting temperature than the starting wax or wax blend.

2. The process of claim 1 wherein the amount of trans-4-tertbutyl-1-phenylcyclohexanol is from about 2 to about 12 wt. % based on the total weight of the wax plus trans-4-tertbutyl-1-phenylcyclohexanol.

3. The process of claim 2 wherein the wax is selected from animal waxes, vegetable waxes, mineral waxes, petroleum waxes, synthetic waxes, and blends thereof.

4. The process of claim 3 wherein the wax is a synthetic wax selected from the group consisting of polyethylene waxes, synthetic mineral waxes, modified waxes, polymerized alpha-olefin waxes, and blends thereof.

5. The process of claim 3 wherein the wax is a vegetable wax selected from the group consisting of bayberry wax, candelilla wax, carnauba wax, esparto wax, jojoba wax, ouricury wax, palm wax, rice wax, soy wax, and blends thereof.

6. The process of claim 3 wherein the wax is a petroleum wax selected from the group consisting of paraffin waxes, slack wax, scale wax, microcrystalline wax, polyalphaolefin waxes and blends thereof.

7. A process for enhancing the melting point properties of a wax or wax blend, which method comprising:
   melting said wax or wax blend to form a melt;
   adding from about 1 to about 12 wt. % of trans-4-tertbutyl-1-phenylcyclohexanol to said melt thereby forming a mixture, which wt. % is based on the total weight of the wax plus trans-4-tertbutyl-1-phenylcyclohexanol;
   agitating said mixture for an effective amount of time so that substantially all of said trans-4-tertbutyl-1-phenylcyclohexanol dissolves in said melt, thereby resulting in a modified melt;
   cooling said modified melt to transform it into a solid state having a higher melting temperature than the wax or wax blend.

8. The process of claim 7 wherein the wax is selected from animal waxes, vegetable waxes, mineral waxes, petroleum waxes, synthetic waxes, and blends thereof.

9. The process of claim 8 wherein the wax is a synthetic wax selected from the group consisting of polyethylene waxes, Fischer-Tropsch waxes, modified waxes, polymerized alpha-olefin waxes, and blends thereof.

10. The process of claim 8 wherein the wax is a vegetable wax selected from the group consisting of bayberry wax, candelilla wax, carnauba wax, esparto wax, jojoba wax, ouricury wax, palm wax, soy wax, rice wax, and blends thereof.

11. The process of claim 8 wherein the wax is a petroleum wax selected from the group consisting of paraffin waxes, slack wax, scale wax, microcrystalline wax, and blends thereof.

12. A wax composition of matter comprised of a wax or wax blend and from about to about 12 wt. % of trans-4-tertbutyl-1-phenylcyclohexanol to said melt thereby forming a mixture, which wt. % is based on the total weight of the wax plus trans-4-tertbutyl-1-phenylcyclohexanol.

13. The process of claim 12 wherein the wax is selected from animal waxes, vegetable waxes, mineral waxes, petroleum waxes, synthetic waxes, and blends thereof.

14. The process of claim 13 wherein the wax is a synthetic wax selected from the group consisting of polyethylene waxes, Fischer-Tropsch waxes, substituted amide waxes, polymerized alpha-olefin waxes, and blends thereof.

15. The process of claim 13 wherein the wax is a vegetable wax selected from the group consisting of bayberry wax, candelilla wax, carnauba wax, esparto wax, jojoba wax, ouricury wax, palm wax, soy wax, and blends thereof.

* * * * *